(12) United States Patent
Nishimura et al.

(10) Patent No.: US 10,329,642 B2
(45) Date of Patent: Jun. 25, 2019

(54) SOLDER ALLOY AND JOINT THEREOF (71) Applicant: NIHON SUPERIOR CO., LTD., Suita-shi, Osaka (JP)

(72) Inventors: Tetsuro Nishimura, Osaka (JP); Shoichi Suenaga, Osaka (JP); Takashi Nozu, Osaka (JP); Motonori Miyaoka, Osaka (JP); Yasufumi Shibata, Aichi (JP)

(73) Assignee: NIHON SUPERIOR CO., LTD., Osaka (JP)

( * ) Notice: Subject to any disclaimer, the term of this patent is extended or adjusted under 35 U.S.C. 154(b) by 954 days.

(21) Appl. No.: 14/775,013

(22) PCT Filed: Mar. 12, 2014

(86) PCT No.: PCT/JP2014/056440
§ 371 (c)(1),
(2) Date: Sep. 11, 2015

(87) PCT Pub. No.: WO2014/142153
PCT Pub. Date: Sep. 18, 2014

(65) Prior Publication Data
US 2016/0032424 A1 Feb. 4, 2016

(30) Foreign Application Priority Data
Mar. 13, 2013 (JP) .................. 2013-050758

(51) Int. Cl.
*B23K 1/19* (2006.01)
*C22C 13/00* (2006.01)
(Continued)

(52) U.S. Cl.
CPC ............ *C22C 13/00* (2013.01); *B23K 1/0006* (2013.01); *B23K 1/0016* (2013.01); *B23K 1/19* (2013.01);
(Continued)

(58) Field of Classification Search
CPC ............... B23K 35/262; B23K 35/282; B23K 35/3006; B23K 1/0006; B23K 1/0016; B23K 1/19
See application file for complete search history.

(56) References Cited

U.S. PATENT DOCUMENTS 4,451,541 A * 5/1984 Beal ..................... B23K 35/282
228/111.5
4,816,219 A * 3/1989 Nishimura ............. B23K 35/26
420/570
(Continued)

FOREIGN PATENT DOCUMENTS

JP 2000-015478 1/2000
JP 2000-280066 10/2000
(Continued)

OTHER PUBLICATIONS

Machine Translation of JP2011-156558, https://worldwide.espacenet.com, Nov. 16, 2018 (Year: 2011).*
(Continued)

*Primary Examiner* — Daniel J Wiley
(74) *Attorney, Agent, or Firm* — Thompson Hine LLP (57) ABSTRACT

A silver electrode joint having a high joint strength obtained by actively minimizing the particle size of a silver-zinc intermetallic compound at the solidification point. A joint obtained by joining an article to be joined, the joint including silver at least as the surface layer thereof, using a solder alloy which comprises 2-9 wt % of zinc, 0.0001-0.1 wt % of manganese and the balance consisting of tin, the solder joint having a joint interface wherein the particle size of a silver-zinc intermetallic compound, which is formed by silver being the surface layer of the article to be joined and zinc in the solder alloy, is 5 µm or less.

3 Claims, 6 Drawing Sheets

(51) Int. Cl.
  *B23K 1/00* (2006.01)
  *B23K 35/28* (2006.01)
  *B23K 35/30* (2006.01)
  *B23K 35/00* (2006.01)
  *B23K 103/08* (2006.01)
  *B23K 103/12* (2006.01)
  *B23K 103/18* (2006.01)
  *B23K 101/36* (2006.01)

(52) U.S. Cl.
  CPC .......... *B23K 35/007* (2013.01); *B23K 35/282* (2013.01); *B23K 35/3006* (2013.01); *B23K 2101/36* (2018.08); *B23K 2103/08* (2018.08); *B23K 2103/12* (2018.08); *B23K 2103/18* (2018.08)

(56) References Cited

U.S. PATENT DOCUMENTS

| | | | |
|---|---|---|---|
| 5,066,544 A * | 11/1991 | Betrabet | B23K 35/262 228/248.5 |
| 5,417,771 A * | 5/1995 | Arita | B23K 35/3612 148/23 |
| 5,487,868 A * | 1/1996 | Nishimura | B23K 35/262 228/262.9 |
| 6,180,055 B1 * | 1/2001 | Tetsuro | B23K 35/262 420/560 |
| 6,296,722 B1 * | 10/2001 | Nishimura | B23K 35/262 148/400 |
| 6,699,306 B2 * | 3/2004 | Nishimura | B23K 3/0646 228/10 |
| 6,936,219 B2 | 8/2005 | Kopeliovich et al. | |
| 7,338,567 B2 * | 3/2008 | Munekata | B23K 1/0016 148/400 |
| 8,999,519 B2 * | 4/2015 | Nishimura | B23K 35/0244 228/262.9 |
| 9,095,936 B2 * | 8/2015 | McIsaac | B23K 1/0008 |
| 9,221,131 B2 * | 12/2015 | Ingham | B23K 35/262 |
| 9,339,893 B2 * | 5/2016 | Nishimura | C22C 13/00 |
| 9,999,945 B2 * | 6/2018 | Nishimura | B23K 35/262 |
| 2001/0029095 A1 * | 10/2001 | Tadauchi | B23K 35/262 438/612 |
| 2002/0148499 A1 * | 10/2002 | Tanaka | H01L 31/022425 136/256 |
| 2004/0208779 A1 | 10/2004 | Kopeliovich et al. | |
| 2013/0248586 A1 * | 9/2013 | Harris | B23K 35/3006 228/244 |
| 2016/0082552 A1 * | 3/2016 | Yamazaki | B23K 35/28 257/771 |
| 2016/0144460 A1 * | 5/2016 | Burda | B23K 35/36 428/634 |

FOREIGN PATENT DOCUMENTS

| | | |
|---|---|---|
| JP | 2002-217434 | 8/2002 |
| JP | 2011-156558 | 8/2011 |
| WO | 03/004713 A2 | 1/2003 |

OTHER PUBLICATIONS

Machine Translation of JP2002-217434, https://worldwide.espacenet.com, Nov. 16, 2018 (Year: 2002).*
PCT, International Search Report, International Application No. PCT/JP2014/056440 (dated Jun. 10, 2014, published Sep. 18, 2014).
PCT, International Preliminary Report on Patentability (English Translation), International Application No. PCT/JP2014/056440 (dated Sep. 17, 2015).
PCT, English translation of the International Preliminary Report on Patentability, International Application No. PCT/JP2014/056440 (dated Sep. 17, 2015).

* cited by examiner

SOLDER ALLOY AND JOINT THEREOF

FIELD

The present disclosure relates to solder-alloy compositions and solder joints, and more particularly, to lead-free solder alloy compositions and joints.

BACKGROUND

Lead-tree solder alloys have become desirable in view of environmental concerns in recent years, and a tin-zinc based solder alloy is known as one of those types.

One application of a solder alloy is to join metal to metal at a relatively low melting point. If the metal to be joined has a composition not contained in the solder alloy, the metal to be joined elutes into a molten solder during a soldering operation, that is, a so-called erosion phenomenon occurs. A copper erosion phenomenon or a silver erosion phenomenon occurs when a target to be joined is copper or silver, respectively, and an intermetallic compound is formed of the eluting metal and a part of the solder alloy composition particularly on a joint boundary and is fixed thereto with solidification. Generation of the intermetallic compound between the metal eluting from the soldering target and the metal contained in the solder alloy is unavoidable in soldering, and the generation itself has no problem. However, if a grain size when the generated intermetallic compound is solidified is relatively large, it causes deterioration to progress on the joint boundary over time. That is, in the intermetallic compound formed of a plurality of types of metal, Kirkendall voids appear due to a difference in diffusion speeds of metal atoms, and there is a concern that the void chronologically develops into a crack due to an external factor such as an external stress, a heat cycle and the like, which might result in breakage of the joint boundary in the end.

If the grain size of the intermetallic compound is large, the difference in the diffusion speeds of the metal atoms is considered to have a great influence and to raise a probability of occurrence of Kirkendall voids. Therefore, even if the tin-zinc-based solder is selected, a solidification grain size of an intermetallic compound on the joint boundary is preferably as small as possible depending on the joint.

SUMMARY OF INVENTION

Technical Problem

Japanese Patent Laid-Open No. 2000-15478 describes compositions containing a small amount of an addition in the tin-zinc base, and manganese is exemplified as the added element. It is described that by means of these compositions, stability of the tin-zinc solder is improved when they are prepared as a solder paste, and change of the solder after joining over time can be suppressed. However, this known technology does not specify the composition of the joint and does not consider generation of the intermetallic compound between the solder composition and the joint composition.

Japanese Patent Laid-Open No. 2000-28066 discloses a technology in which tin-zinc is a main component and manganese is added thereto as a type of deoxidizing element based on a fact that manganese strongly reacts with oxygen. It also describes finding of high solder joining characteristics to a metallic electrode on glass as a result.

Japanese Patent Laid-Open No. 2011-156558 describes a solder alloy constituted by 0.01 to 10 weight % of zinc, 0.1 weight % or less of Mn manganese and the remaining tin. Moreover, in addition to metallic materials such as copper, nickel, and the like, which are materials of prior-art electronic components, and a solder joint portion of a printed circuit board, it describes high solder joining characteristics to a metallic electrode on glass. However, this known technology assumes solder joining characteristics mainly with aluminum.

U.S. Patent No. 6,936,219 discloses use of the tin-zinc alloy containing manganese 0.001 to 0.9 weight % manganese as the solder alloy. This known technology does not consider the intermetallic compound generated between the solder composition and the joint composition similarly to other known technologies.

SUMMARY

The disclosed solder alloy and joint is a solder electrode joint with high joining strength obtained by actively minimizing the grain size of an intermetallic compound at solidification. This process generates a joint to a silver electrode by using a tin-zinc-based solder composition. The intermetallic compound of silver-zinc is generated between zinc in the solder composition and silver eluting from the joint, and constitutes a part of the joint boundary.

Conventionally, in order to join a terminal component to a silver joint fixed to a window pane of an automobile, particularly to a rear windshield, a tin-lead-based solder or a tin-indium-based solder has been used, but the solder containing lead as the tin-lead base is not used much recently. Moreover, in the case of the tin-indium based solder, a melting point of the solder alloy is low, and an alloy composition grows chronologically and thus, reliability cannot be guaranteed easily. Moreover, tin-indium solder alloys have low mechanical strength, and indium is expensive.

In order to achieve the aforementioned object, the disclosed joint uses a solder alloy in which at least a surface layer is silver, the solder alloy being composed of 2 to 9weight % of zinc, 0.0001 to 0.1 weight % of manganese, and the remainder of tin. Silver that is present in the surface layer of the joint is molten into the solder by erosion during soldering, combines with zinc contained in the solder composition, and generates a silver-zinc intermetallic compound. As a result, the silver-zinc intermetallic compound constitutes a boundary between the joint and the solder and functions as a barrier layer, suppressing further elution of silver. Tin and zinc are eutectic at tin at 91 weight % of in binary. If the content of zinc is 1 weight %, silver erosion beyond expected occurs, but if the content is 2 weight %, an expected effect of suppressing silver erosion can be ensured at the minimum. A lower limit value of zinc was set to 2 weight % by considering that. On the other hand, if too much zinc is contained, erosion progresses and thus, an upper limit was set to 9 weight %. A melting point at an eutectic point of tin and zinc is 198.5° C., but the melting point in the present invention does not have to be as low as the eutectic point of tin and zinc from an industrial viewpoint, and thus, the eutectic is not given importance in setting the upper limit value. Or rather, as the result of attention paid to suppression of silver erosion as the purpose of the present invention, the upper limit value of zinc was set to 9 weight % which is the eutectic point.

The applicants did not confirm presence of manganese added in a slight amount in the joint boundary but considered that, in a growth process of the silver-zinc intermetallic compound, manganese diffused in a molten solder has some influence to a difference in diffusion speeds of silver and zinc so that growth of the silver-zinc intermetallic compound in a solidification process is suppressed and coarsening of a crystal grain size is hindered, and thus it is added in a slight amount to the alloy. Regarding the contents, manganese does not constitute eutectic either with tin or zinc at least within a range of a mixed amount set, respectively. However, if 0.01 weight % is exceeded, an effect of addition gradually lowers and thus, 10 times of the content was set to be the upper limit. Regarding the lower limit value, it was confirmed that, even if manganese is added in a slight amount, the effect of suppressing the grain size of the silver-zinc intermetallic compound is exhibited, but since an amount lower than 0.0001 weight % is technically difficult as a range that can be properly contained industrially, this value was set to be the lower limit value.

The joint is obtained by using the solder alloy having the aforementioned composition, but in this case, silver is precipitated from the surface layer of the joint, combines with zinc in the solder alloy and forms the silver-zinc intermetallic compound. Here, by diffusing manganese in an appropriate amount into the molten solder, the joint boundary having the grain size of the silver-zinc intermetallic compound at 5 µm or less can be obtained.

Moreover, in order to set the grain size of the silver-zinc intermetallic compound present in the joint boundary to the preferable 5 µm or less, a method of applying so-called preliminary soldering was used in which solder plating is applied to both joint surfaces of the joint using the solder alloy similarly having the aforementioned composition and the solder plating is heated/molten and solidified while the solder plating surfaces are brought into contact with each other. If the preliminary soldering is not applied, materials with three different compositions, that is, the copper alloy terminal, the silver electrode, and the solder alloy of the present invention are to be joined, but in order to join them in one procedure, a condition satisfying both compatibility of the composition and compatibility of a shape at the same time is needed. In the preliminary soldering in the present invention, the solder alloy is applied on the copper alloy terminal and the solder alloy on the surface of the silver electrode in advance, and as a result, when the copper alloy terminal is to be joined to the silver electrode, the solder alloys with the same composition are molten/joined to each other, and a firmer joint can be obtained. Moreover, at the time of preliminary soldering, a joint temperature of the preliminary solder to the silver electrode can be lower than a temperature at which the preliminary soldering is applied to the copper alloy terminal and thus, excessive heat energy is not given to the silver electrode and the solder alloy, and prevention of coarsening of the grain size of the silver-zinc intermetallic compound can be expected. Moreover, since preliminary soldering is applied to the copper alloy terminal and the silver electrode, respectively, the silver-zinc intermetallic compound is generated in the boundary between the silver electrode and the preliminary solder, the copper-zinc intermetallic compound is generated in the boundary between the copper alloy terminal and the preliminary solder, and as a result, the composition of the preliminary solder transfers to tin rich which is a base material. That is, since zinc has decreased on the surfaces of both preliminary solders, soldering can be performed at a temperature closer to the melting point of tin.

Moreover, in joining of the joint to which solder plating is applied in advance, it is only necessary that the heating temperature is 230° C. at which the solder alloy is molten or more and that a temperature range in which nonconformity such as oxidation of the molten solder alloy or the like does not occur or at 300° C. or less, for example, is acceptable. However, in the case of a ternary alloy of the present invention with a content of 2 to 9 weight % of zinc and a slight amount of manganese added, a highest melting point is approximately 230° C. even in the case of 2 weight % of zinc, and in order to reliably melt it and to obtain a stable joint boundary, overheating at approximately 20° C. is required, and a heating temperature at 250° C. is more preferable. However, the aforementioned heating temperature is not a set temperature in a strict meaning but is set by considering a melting point of a solder alloy to be used.

In the present invention, the solder alloy, in which 2 to 9 weight % of zinc with respect to tin is contained and furthermore 0.0001 to 0.1 weight % of manganese is added in a slight amount, is employed so that manganese is diffused in the molten solder, and the crystal grain size can be made to 5 µm or less when the intermetallic compound of silver and zinc eluting from the joint target is generated. As a result, occurrence of Kirkendall voids is suppressed, and development of this Kirkendall voids into a crack can be prevented. Therefore, the joint using the disclosed solder alloy can prevent excessive elution of silver from the joint surface and can obtain form a composition with high joint reliability.

In the present invention, when the joint is to be obtained by using the aforementioned solder alloy, the solder plating with the same composition is applied in advance to both the joint surfaces of the two joints, and the solder platings are heated to molten while the solder platings are brought into contact with each other to manufacture the solidified solder joint and thus, occurrence of voids in the joint boundary can be effectively suppressed. Since the preliminary soldering is applied to each of the copper alloy terminals and the silver electrode separately, the preliminary soldering can be fixed under the respective appropriate temperature conditions and the like and moreover, since particularly silver erosion is prevented by the joint boundary made of the intermetallic compound generated in each of them, occurrence of the Kirkendall voids caused by the diffusion speed of the metal can be suppressed.

DETAILED DESCRIPTION

Figure 1:
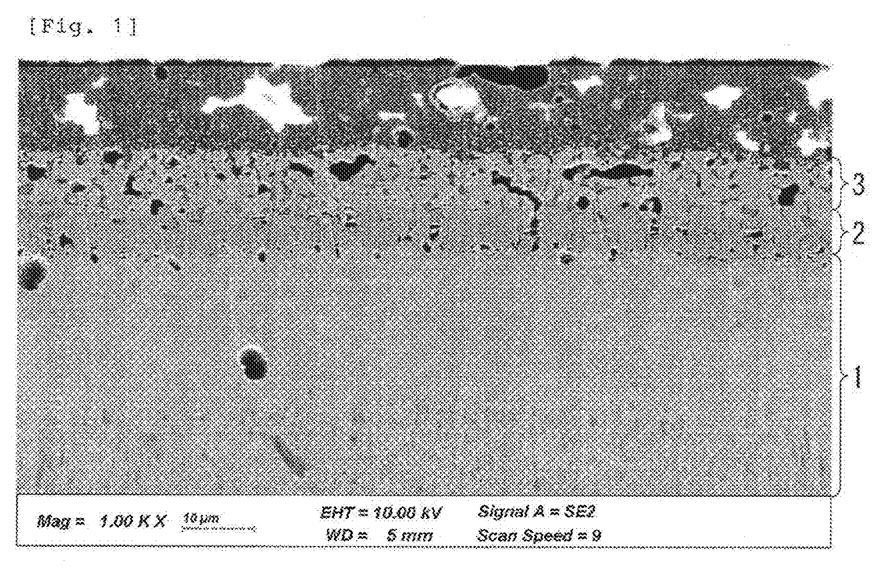
FIG. 1 is a photograph of an embodiment of the disclosed solder alloy, soldered to a silver electrode provided on a glass substrate to constitute a joint.

An embodiment of the disclosed solder composition and joint will be discussed on the basis of examples. FIG. 1 is a photograph of a sectional structure of a state in which preliminary soldering was applied and then, solder joining was performed using an embodiment of the disclosed solder alloy. A composition of the preliminary solder was 91.853Sn-8.14Zn-0.0070Mn (weight %), and soldering was performed with an iron-tip set temperature at 250° C. The composition shows a solder layer 1 made of a tin-zinc composition, a joint boundary layer 2 made of an silver-zinc intermetallic compound, and an electrode layer 3 made of silver from the lowest layer.

EXAMPLE

In a mode illustrated in FIG. 1, it was confirmed whether or not a difference is found in strength depending on a difference in a grain size of the silver-zinc intermetallic compound appearing in the joint boundary layer 2. The difference in strength was confirmed by visually checking a state of a crack occurring on the joint boundary after a durability test was conducted. The durability test was conducted such that a test piece in which the silver electrode is baked on a glass plate and a terminal in which tin plating is applied on a Cu copper alloy base material corresponding to a copper alloy terminal were joined to each other, a heat cycle test was conducted and then, a sectional structure of a joint portion was observed, and presence of occurrence of a crack was examined. The result is shown in Table 1.

TABLE 1

| Average grain size of AgZn crystal grain (μm) | Presence of a crack in the solder after a durability test |
| --- | --- |
| 20 | Yes |
| 10 | Yes |
| 5 | No |
| 3 | No |
| 1 | No |

The test piece had a size of 89×8×3 mm, a thickness of the silver layer was 20 μm, the terminal had a size of 4×7×0.4 mm in which tin plating was applied to a surface of pure copper, and the preliminary solder was added in an amount of 4.5×7.5×0.2 mm in volume. The heat cycle in which −30° C. was maintained for 30 minutes and the temperature was raised up to +80° C. and maintained for 30 minutes was repeated 1000 times.

As the result of the test, no crack was confirmed in a specimen of the silver-zinc intermetallic compound with an average grain size of 5 μm or less, while a crack was observed in specimens with the average grain sizes of 20 μm and 10 μm. This experiment is based on a premise that if there is a void inside the boundary, it develops to a crack by a heat cycle.

Figure 2:
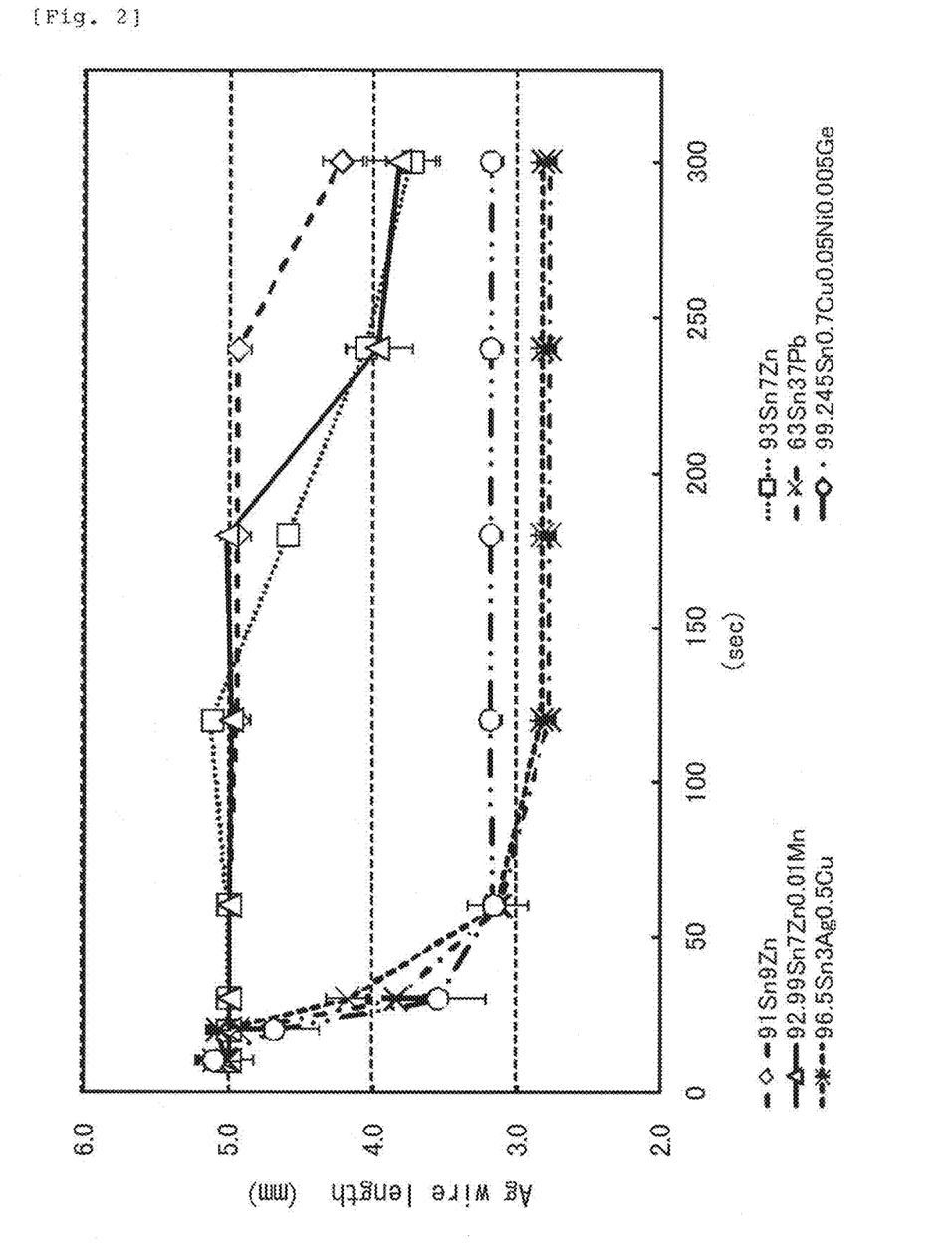
FIG. 2 is a graph in which a status of silver erosion of an embodiment of the disclosed solder composition is compared with that of another composition.

FIG. 2 shows a result in a graph obtained by immersing a silver wire having a diameter of 0.25 mm and a length of 10 mm to a half of six types of solder baths with different compositions and by measuring a remaining length at pre-determined time intervals. A molten solder temperature was 300° C. In the experiment, the specimen 91Sn9Zn within the range of the present invention showed extremely favorable anti-silver erosion, and 93Sn7Zn and 92.99Sn7Zn0.01Mn also showed favorable anti-silver erosion performances. However, in the other specimens, approximately 2 mm was lost by erosion after approximately 50 seconds had elapsed. From this fact, it was confirmed that the solder composition containing 7 to 9 weight % of zinc with tin as the base material presented favorable anti-silver erosion performances.

Figure 3:
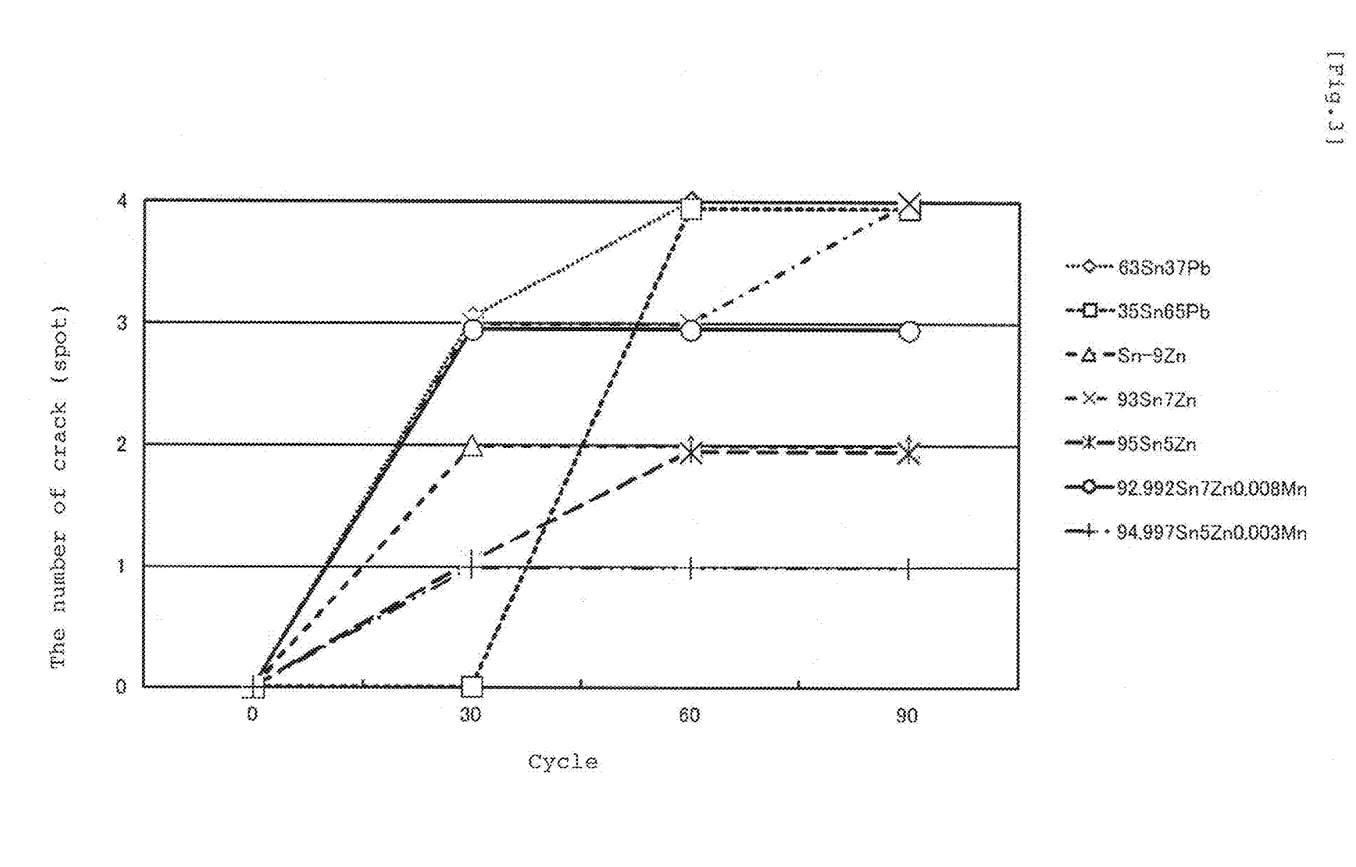
FIG. 3 is a graph in which an embodiment of the disclosed solder composition and another composition are both subjected to a heat cycle test and occurrence degrees of a crack are shown.

A graph in FIG. 3 shows a result of a heat cycle test obtained by repeating 90 cycles within a range of 90° C. to −40° C. using a test piece made of seven types of compositions. As the test piece, a material obtained by soldering a solder foil having a width of 5 mm, a length of 10 mm, and a thickness of 0.6 mm to a surface of a silver electrode (foil thickness of approximately 15 μm) on a glass surface having a width of 50 mm, a length of 100 mm, and a thickness of 5 mm was used. As a result, when 93Sn7Zn is compared with 92.992Sn7Zn0.008Mn with a slight amount of manganese added, appearance of cracks was less in the specimen with manganese added, and similarly when 95Sn5Zn and 94.997Sn5Zn0.003Mn are compared, it was also confirmed that appearance of cracks was less in the specimen with manganese added. From these relations, it can be understood that appearance of cracks can be reduced by obtaining a joint by employing a solder alloy with the composition with addition of manganese in the solder with the tin-zinc composition. In crack check, the test piece was taken out in the middle of the heat cycle test, a soldered spot was observed from a rear surface the glass with a stereo microscope at 10 magnifications), and the number of cracks detected on the glass surface was counted. That is, a check of the strength of the joint boundary was replaced by comparison of generated stresses caused by a difference in a coefficient of thermal expansion between the glass including the silver electrode and the solder.

Figure 4:
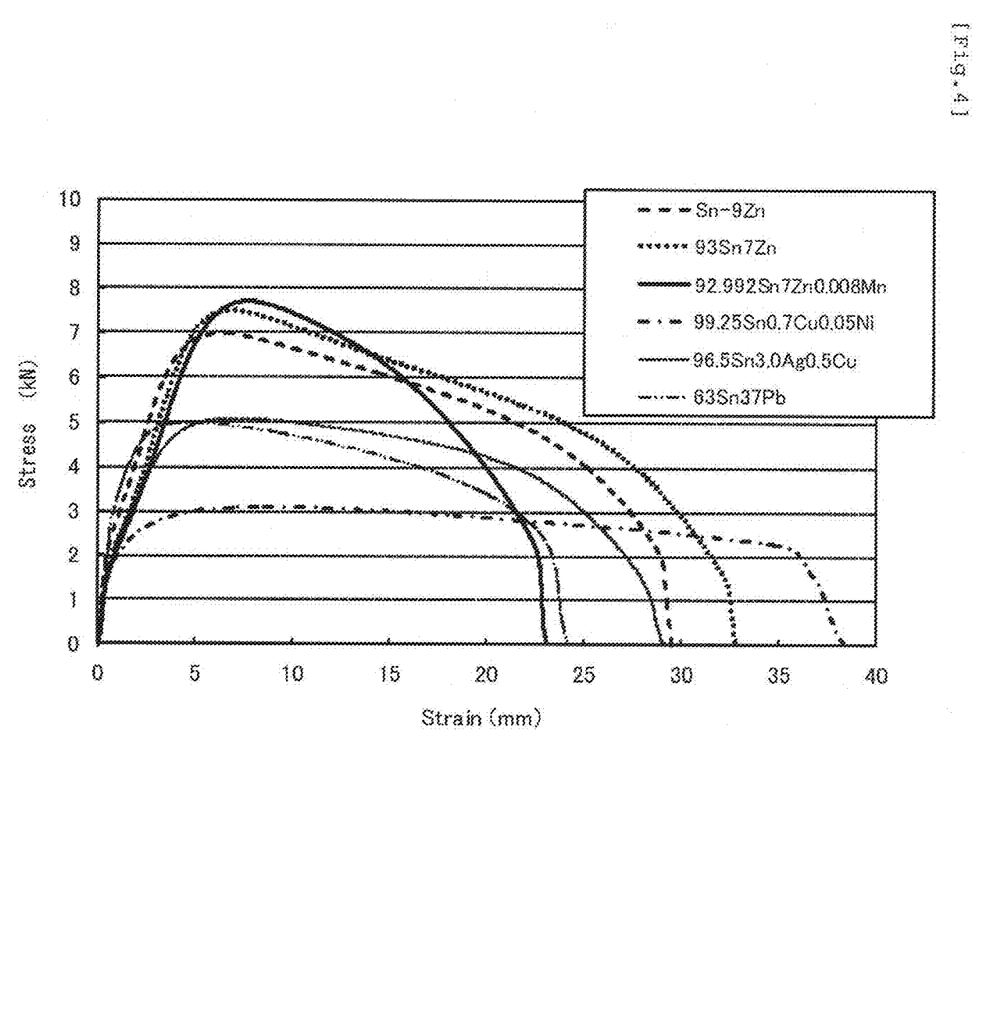
FIG. 4 is a graph illustrating a result of a tension test of the same.

A graph in FIG. 4 shows a result of a tension test of test pieces made of six types of compositions. In a test method, the test pieces obtained by melting the compositions at a liquid phase temperature +100° C. in an electric furnace and a graphite crucible and by casting them in a casting die at a room temperature were used. The test pieces were prepared into a size of a whole length of 170 mm, a parallel part length of 60 mm, a width of 10 mm, and a thickness of 10 mm, and the test pieces were pulled with a force of tensile strength of 10 mm/minute by every 25 mm from a center of the test pieces at a room temperature, that is, an inter-mark distance of 50 mm. The measurement complies with JIS (Japan Industrial Standard). As a result, the specimen of 92.992Sn7Zn0.008Mn within the range of the disclosed composition exhibited the most favorable resistance against tension. A largely favorable tensile strength was also shown by 93Sn7Zn without manganese addition. That was caused by fragmentation of the solder composition by addition of the slight amount of manganese. From these facts, it is considered that occurrence of Kirkendall voids in the vicinity of the joint boundary was suppressed, and a uniform structure could be obtained even if the joint was obtained by employing the solder alloy with manganese addition.

Figure 5:
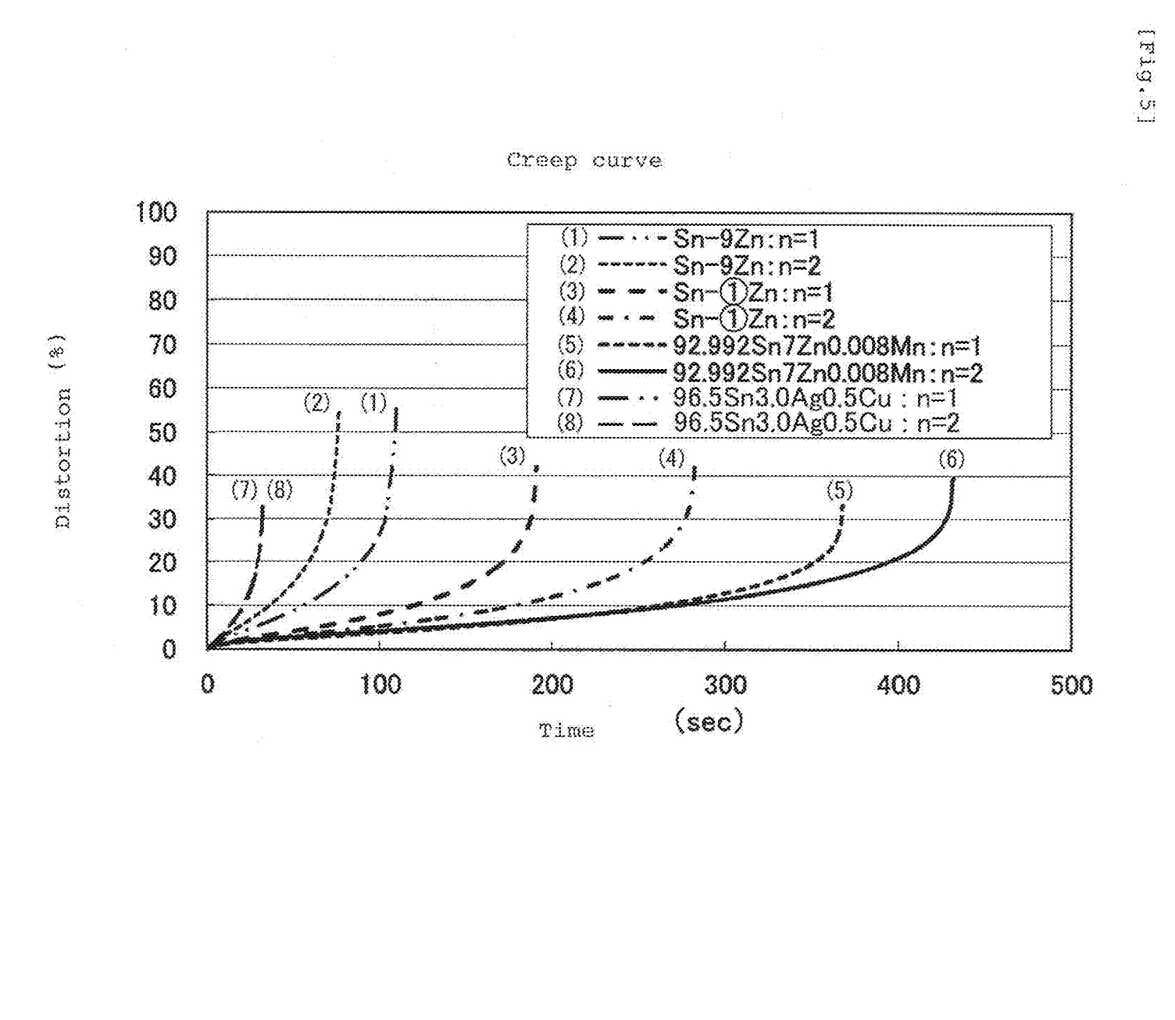
FIG. 5 is a graph illustrating a creep characteristic of the same.

A graph in FIG. 5 shows a creep characteristic, and the test method in which a load of 30 kg was applied to the test piece prepared similarly to FIG. 4 under a temperature atmosphere of 100° C. was used, and the test was conducted twice each for four types of specimens. The inter-mark distance was 50 mm. As a result, the test piece with manganese addition showed the most favorable creep characteristic similarly to the tensile test result in FIG. 4.

Figure 6:
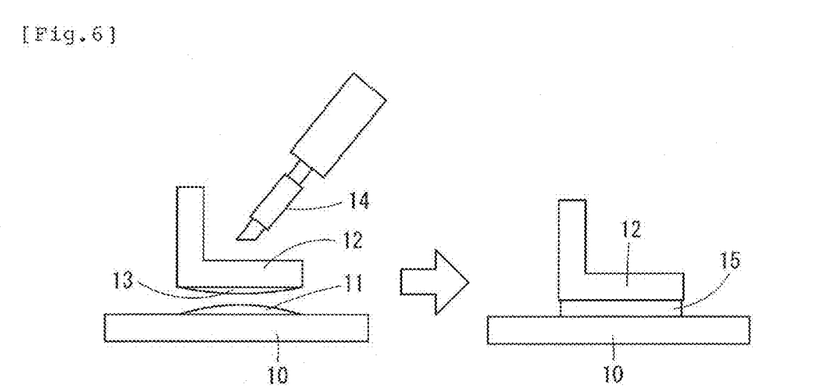
FIG. 6 is a schematic view illustrating a procedure of applying solder plating in advance to a joint together with a comparative example.
Figure 7:
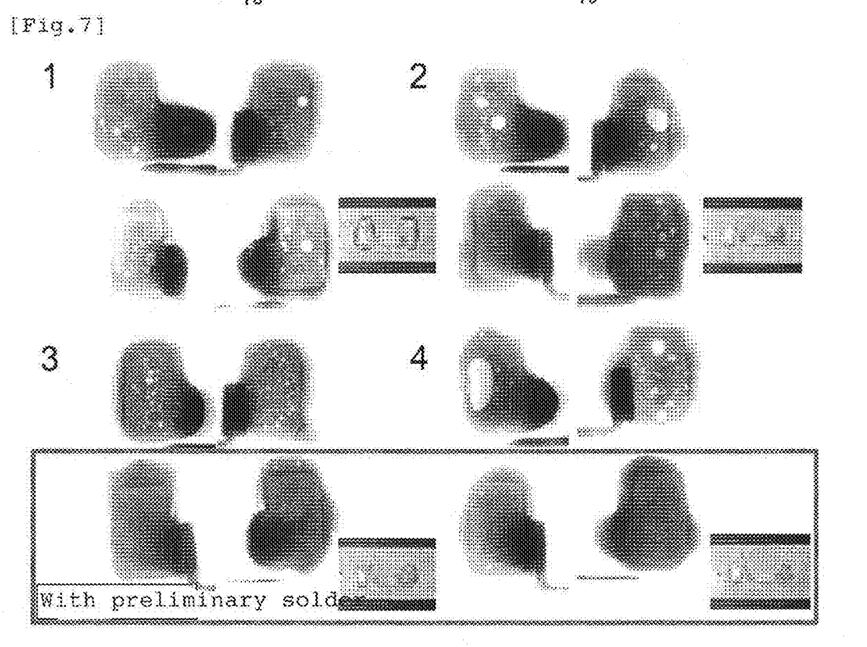
FIG. 7 is a comparative photo illustrating the occurrence degrees of voids of a joint to which the solder plating is applied in advance and a joint without the solder plating.

Subsequently, FIG. 6 is a schematic view illustrating the case in which the preliminary soldering with the composition having been already described is performed, in which reference numeral 10 denotes the silver electrode provided on the surface of the glass plate, reference numeral 11 denotes the preliminary solder on the silver electrode 10 side with solder plating applied, 12 denotes the copper alloy terminal, and 13 denotes the preliminary solder provided on the joint surface of the copper alloy terminal and also with solder plating applied. Reference numeral 14 shows a solder iron. In a process, while solder plating is applied to both electrode 10 and terminal 12, they are brought into contact with each other as illustrated in FIG. 6 left side, the solder iron 14 is brought into contact on a rear surface side of the solder plating of the copper alloy terminal 12, and heated to approximately 250° C. Then, both solder platings 11,13 become molten, and a joint portion 15 of the solder is formed as illustrated in FIG. 6 right side. In FIG. 6 right side, the joint boundary actually appears both on the silver electrode 10 side and the copper alloy terminal 12 side, but they are not shown. By employing this method, since flux is not needed, a void inevitably generated at boiling/evaporation of the flux can be avoided. A joint joined in this way is shown in comparison with a joint joined without applying the preliminary solder in FIG. 7. FIG. 7 is a radiographic photograph obtained by irradiation by X-rays in order to confirm the state inside the solder joint, and little occurrence of a void was found in the specimen to which the preliminary soldering was applied, while a plurality of voids were found in all the specimens to which the preliminary soldering was not applied.

REFERENCE NUMERALS

1 Solder layer
2 Joint boundary layer
3 Ag electrode layer
10 Ag electrode
11, 13 Solder plating
12 Cu alloy terminal
15 Joint portion

What is claimed is:

1. A solder joint, comprising:
   a joint in which at least a surface layer is silver and is joined by a solder alloy composed of 2 to 9 weight % of zinc, 0.0001 to 0.1 weight % of manganese, and a remainder of tin, the solder joint having a joint boundary in which a silver-zinc intermetallic compound formed of silver of the surface layer of the joint and zinc in the solder alloy has a grain size of 5 μm or less;
   wherein a solder plating with the solder alloy is applied in advance to a first joint surface and a second joint surface of the joint, and the first solder plating and the second solder plating are heated to be molten while the first solder plating and the second solder plating are brought into contact with each other, and then solidified;
   and wherein a heating/melting temperature of the solder alloy is 230° C.-300° C.

2. A solder joining method, comprising:
   plating a first joint surface and a second joint surface of a joint to have a solder plating in which at least a surface layer is silver and is plated in advance with a solder alloy composed of 2 to 9 weight % of zinc, 0.0001 to 0.1 weight % of manganese, and a remainder of tin;
   heating to a temperature of 230° C.-300° C. the solder platings on the first joint surface and the second joint surface to be molten while bringing the solder platings into contact with each other; and
   cooling the solder platings until the solder platings are solidified.

3. The solder joining method according to claim 2, further comprising forming a silver-zinc intermetallic compound of silver of the surface layer of the joint and zinc in the solder alloy, such that the intermetallic compound has a grain size of 5 μm or less.

* * * * *